United States Patent Office 3,708,515
Patented Jan. 2, 1973

3,708,515
PROCESS OF PREPARING γ-CYANO-BUTYRALDIMINES
Jozef A. Thoma, Sittard, Joseph F. M. Klein, Bunde, and Leonardus H. Geurts, Geleen, Netherlands, assignors to Stamicarbon N.V. Heerlen, Netherlands
No Drawing. Filed Feb. 4, 1970, Ser. No. 8,703
Claims priority, application Netherlands, Feb. 8, 1969, 6902028
Int. Cl. C07c 121/46, 121/42
U.S. Cl. 260—464                  8 Claims

ABSTRACT OF THE DISCLOSURE

A process is disclosed for the conversion of an acetaldimine and acrylonitrile in a molar ratio of at least 0.8 to 1, respectively, and at a temperature of 70° C. to 130° C. to the corresponding γ-cyanobutyraldimine, the unconverted reactants being recovered from the reaction mixture and re-cycled. The resulting γ-cyanobutyraldimine product can then be hydrolized to the corresponding γ-cyanobutyraldehyde.

---

The present invention relates to a process of preparing γ-cyanobutyraldimines (mono-β-cyano-ethylated acetaldimines) by reacting an acetaldimine with acrylonitrile.

It is known that by heating an equimolecular mixture of N-cyclohexyl-n-butyraldimine and acrylonitrile to 150° C. a reaction product can be obtained which yields 73% of 2-(β-cyanoethyl)-N-cyclohexyl-n-butyraldimine. See U.S. Pat. 2,768,962. This yield can be increased to 80% if a ratio of 1.2 moles of acrylonitrile per mole of the aldimine is used. When N-cyclohexyl-oenanthaldimine as the aldimine is heated to 150° C. with 1.2 moles of acrylonitrile per mole of aldimine, the reaction gives a 60% yield of 2-(β-cyanoethyl)-N-cyclohexyl-oenanthaldimine.

However, when the simplest group of aldimines, namely the acetaldimines, are converted with acrylonitrile in a similar manner, as by heating a mixture of acrylonitrile and acetaldimine in the ratio of 1-1.2 moles of acrylonitrile per mole of acetaldimine to 150° C., the reaction product contains only a very small proportion of γ-cyanobutyraldimine in addition to a large amount of undesirable contaminants. The yield of γ-cyanobutyraldimine is only 10% at most, and the purity of the γ-cyanobutyraldimine recovered from the reaction product is 40% at best.

It has now been found that by reacting acetaldimines with acrylonitrile as represented by the reaction:

(I) NC—CH=CH$_2$+CH$_3$—CH=N—R→
NC—(CH$_2$)$_3$—CH=N—R

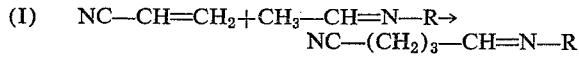

the corresponding γ-cyanobutyraldimines can be obtained economically and of a considerably higher degree of purity when the temperature of the reaction is maintained between 70–130° C., a reactant ratio of at least 0.8 mole of the acetaldimine per mole of acrylonitrile is employed and following the conversion of up to 50% of the acrylonitrile, the reaction mixture is separated and the non-converted acrylonitrile and acetaldimine are recovered and recycled.

Consequently, the invention provides a process for reaction of an acetaldimine with acrylonitrile to prepare the corresponding γ-cyanobutyraldimines. According to the invention, the acrylonitrile is reacted with the acetaldimine at a temperature of between 70° C. and 130° C. and in a ratio of at least 0.8 mole of the aldimine per mole of acrylonitrile and before more than about 50% of the acrylonitrile has been converted, the non-converted acrylonitrile and acetaldimine are separated and recovered from the reaction mixture.

The γ-cyanobutyraldimines obtained by the process according to the present invention are valuable starting materials for various synthesis processes for organic products. For instance, by hydrolysis of γ-cyanobutyraldimine, the corresponding γ-cyanobutyraldehyde can be obtained in addition to the corresponding amine. This amine may be used to form the acetaldimine by reaction with acetaldehyde as represented by the reaction equation:

(II)   CH$_3$CHO+RNH$_2$→CH$_3$CH=N—R thus forming the acetaldimine which is converted with acrylonitrile to the corresponding γ-cyanobutyraldimine, according to the present invention. The preparation of γ-cyanobutyraldehyde from the corresponding γ-cyanobutyraldimines by hydrolysis is the subject of a separate patent application Ser. No. 8,704, which has been filed by the applicant simultaneously herewith. It may be generally represented by the reaction equation:

(III)   NC—(CH$_2$)$_3$—CH=N—R+H$_2$O→
NC—(CH$_2$)$_3$—CHO+RNH$_2$

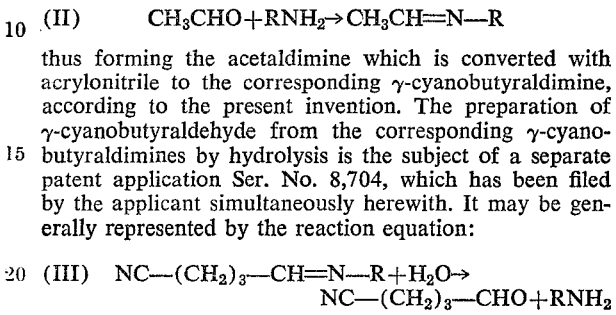

Acetaldimines can be prepared in a conventional manner by reacting acetaldehyde with a primary amine as in reaction II above. This reaction, of course, can be applied to various primary amines. In the process according to the present invention it is not necessary to use pure acetaldimines. The crude acetaldimine obtained in the preparation of an acetaldimine, as described above, may be employed. Generally, such a crude acetaldimine contains some unconverted amine, plus the imine of crotonaldehyde and the corresponding amine.

Preferably acetaldimines are used having a secondary or tertiary carbon atom bound to their nitrogen atom, as, for example, a lower alkyl or cycloalkyl substituent having from 4 to 7 ring carbon atoms bound to its imine nitrogen atom, such as N-cyclohexylacetaldimine and N-tertiary-butylacetaldimine. The cycloalkyl and tertiary butyl N-substituents are preferred for their very favorable reaction with acrylonitrile.

Similarly, the acrylonitrile may contain contaminants, such as acetontrile. For this reason, it may be desirable to add an inhibitor to the acrylonitrile, for example, hydroquinone. All three critical factors, viz: the temperature, the molar ratio of acetaldimine to acrylonitrile, and the conversion of the acrylonitrile, can be varied in the process according to the present invention. Preferably the temperature used is between 80 and 120° C., the molar acetaldimine to acrylonitrile ratio is greater than 1.5:1, and the conversion of the acrylonitrile is between 10 and 35%. The reaction between the acrylonitrile and the acetaldimine need not be carried out in a solvent. However, suitable but non-limiting non-aqueous solvents are, for instance, benzene, toluene, dimethylsulphoxide and benzonitrile.

It is also preferable to avoid or greatly restrict the presence of water in the reaction medium, because acetaldimines are easily decomposed by water. The reaction can be carried out with or without addition of a catalyst. Suitable but non-limiting catalysts are, in general, basic compounds, e.g., quaternary ammonium bases. In addition, it has been found that the amine from which the acetaldimine is composed has a catalytic effect. This amine generally occurs as such in small quantities in the acetaldimine. In the reaction of the acetaldimine with acrylonitrile this amine is formed as a by-product.

The reaction between the acrylonitrile and the acetaldimine can be carried out at atmospheric and at other pressures. Of course, the pressure to be employed is dependent, in part, on the temperature of the reaction mixture and the boiling point of the compounds contained therein.

After the desired conversion of the acrylonitrile has been reached (up to 50%), the reaction mixture is separated, and the non-converted acrylonitrile and acetaldimine are recovered. This separation can be effected by subjecting the reaction mixture to fractional distillation. The amine of which the acetaldimine is composed is also present in the reaction mixture to be separated. The fractional distillation thus yields an amine fraction in addition to an acrylonitrile and an acetaldimine fraction. The amine fraction isolated in the distillation can be converted again with acetaldehyde to form the corresponding acetaldimine, as in reaction II. The resulting acrylonitrile and acetaldimine fractions can be reused and, in a continuous process situation, be recycled directly into the reaction medium.

After the three fractions mentioned above (and the solvent, if any was employed) have been distilled off, the desired γ-cyanobutyraldimine remains in the residual reaction product. This reaction product has also been found to contain the corresponding imine of crotonaldehyde, even if this imine was not present in the original acetaldimine. If so desired, the crotonaldimine can be isolated and be converted by hydrolysis in a dilute aqueous mineral acid to crotonaldehyde and the corresponding amine. The mixture of γ-cyanobutyraldimine and the corresponding crotonaldimine can also be used as such for further synthesis processes, for instance, the preparation of γ-cyano-butyraldehyde, as described in our co-pending application, Ser. No. 8,704, filed Feb. 4, 1970. In addition to γ-cyano-butyraldehyde, crotonaldehyde can then be obtained as a by-product, and the corresponding amine can be recovered.

The ratio between the amount of γ-cyanobutyraldimine produced and the corresponding crotonaldimine in the reaction product appears to depend on the particular acetaldimine used. If, for instance, N-cyclohexylacetaldimine is applied, the reaction product contains mainly N-cyclohexyl-γ-cyanobutyraldimine, whereas if N-tertiary-butyl-acetaldimine is used, the reaction product contains a large amount of N-tertiary-butyl-crotonaldimine.

If it is desirable to limit the formation of the valuable crotonaldimine by-product, the starting product should preferably be N-cyclohexyl-acetaldimine.

In addition to the γ-cyanobutyraldimine and the corresponding crotonaldimine, the reaction product may contain a β-amino-propionitrile, which is formed by reaction of acrylonitrile with the amine present in the reaction mixture, e.g. β-(cyclohexylamine)-propionitrile. The formation of a β-amino-propionitrile compound can be suppressed if, after the desired degree of conversion has been reached (up to 50%), the temperature of the reaction mixture is maintained above 50° C. until the non-converted acrylonitrile has been separated from the reaction mixture. It has also been found that the formation of other undesirable compounds can be suppressed by keeping the temperature of the reaction mixture below 130° C. during the separation process. It is preferable, then that the separation of the reaction mixture be conducted at a temperature below 130° C. and the temperature of the reaction mixture maintained at over 50° C. until the non-converted acrylonitrile has been removed.

The presence of a β-aminopropionitrile, such as β-(cyclohexylamino)-propionitrile, in the ultimate reaction product is not detrimental in further synthesis processes. For example, in the preparation of γ-cyanobutyraldehyde by hydrolysis of a γ-cyanobutyraldimine, thermal decomposition of the β-aminopropionitrile leads to recovery of the corresponding amine and the acrylonitrile. See Example II of our co-pending application Ser. No. 8,704, filed Feb. 4, 1970.

The process provided by the present invention is further illustrated in the following examples.

EXAMPLE I

N-cyclohexylacetaldimine (1250 grams; 10 moles), acrylonitrile (265 grams; 5 moles), and hydroquinone (1 gram) were introduced into a 3-liter flask equipped with a stirrer and a reflux cooler.

The mixture was heated and maintained at a temperature of 105° C. for 1.5 hours, at atmospheric pressure and under a nitrogen atmosphere, with stirring and reflux of acrylonitrile.

Thereafter, non-converted acrylonitrile (215 grams) was removed from the reaction mixture by distillation at 80–90° C. at reduced pressure, indicating that 18.6% of the acrylonitrile was converted. Subsequently, the cyclohexylamine (40 grams) formed during the reaction was distilled off at about 57° C. and about 50 mm. Hg. The non-converted N-cyclohexylacetaldimine (1031 grams) was next removed by distillation at about 42° C. and about 12 mm. Hg.

The reaction product then remaining in the flask was subjected to distillation at reduced pressure and 45 g. of N-cyclohexylcrotonaldimine (boiling point 45° C. at 0.1 mm. Hg) was recovered, leaving 173 g. of liquid in the flask. Gas-chromatographic analysis and mass-spectrometric examination showed the remaining 173 grams of liquid to consist of 87% of N-cyclohexyl-γ-cyanobutyraldimine. With respect to the acrylonitrile consumed, the process yield was 90%.

The N-cyclohexylcrotonaldimine previously separated off was hydrolized with 1 N sulphuric acid (350 ml.) at a temperature of 25–35° C. to form the corresponding crotonaldehyde and the sulphuric acid salt of cyclohexylamine. The resulting mixture was subjected to distillation and the crotonaldehyde was distilled off as an azeotropic mixture with water (yield 92%).

The cyclohexylamine can be recovered from the sulphuric acid salt of cyclohexamine left behind by neutralization and extraction with nearly quantative recovery. The cyclohexylamine thus obtained plus the cyclohexylamine formed in the reaction with acrylonitrile can be converted with acetaldehyde to N-cyclohexylacetaldimine according to general reaction II.

EXAMPLE II

N-cyclohexylacetaldimine (1250 grams), acrylonitrile (265 grams), hydroquinone (1 gram), Triton B (1 gram) and benzonitrile (2000 grams) were introduced into a 5-liter flask equipped with a stirrer and a reflux cooler. The mixture was heated and maintained at a temperature of 110° C. for 1.5 hours at atmospheric pressure and under a nitrogen atmosphere with stirring and reflux of acrylonitrile. The resulting reaction mixture was cooled to room temperature and a distillation of the reaction mixture was conducted at reduced pressure. The following fractions were removed: acrylonitrile (187 grams, cyclohexylamine (29 grams), N-cyclohexylacetaldimine (926 grams), benzonitrile (1995 grams), and N-cyclohexylcrotonaldimine (120 grams). A reaction product (250 grams) remained following distillation. Gas-chromatographic analysis and mass-spectrometric examination showed the remaining reaction product to contain 66.6% by weight of N-cyclohexyl-γ-cyanobutyraldimine and 31% by weight of β-cyclohexylamino)-propionitrile. The propionitrile was formed as a result of the reaction mixture cooling to room temperature. A 25% conversion of the acrylonitrile was obtained. Of the total acrylonitrile consumed, 63.6% was converted to N-cyclohexyl-γ-cyanobutyraldimine and 34% to β-(cyclohexylamino)-propionitrile. The propionitrile can be recovered as such for instance in the hydrolysis reaction of the remaining reaction product in the preparation of γ-cyanobutyraldehyde. Thermal decomposition of this β-(cyclohexylamino)-propionitrile gives acrylonitrile and cyclohexylamine.

EXAMPLE III

N-cyclohexylacetaldimine (1000 grams; 8 moles) was heated to 95° C. in a 3-liter flask equipped with a stirrer and a reflux cooler. At atmospheric pressure and under a nitrogen atmosphere, a mixture of acrylonitrile (265 grams; 5 moles), hydroquinone (1 gram), and Triton B (1 gram) was subsequently added dropwise, with stirring, to the aldimine in the flask over a period of 30 minutes. The reaction mixture was maintained at 95° C. for 1 hour. The non-coverted acrylonitrile (220 grams) was removed from the reaction mixture by distillation at reduced pressure at a temperature of about 85° C. Thereafter, 20 g. of cyclohexylamine (B.Pt. 71–73° C. at 100 mm. Hg) and 846 g. of non-converted N-cyclohexylacetaldimine (B.Pt. 42–43° C. at 12 mm. Hg) were successfully removed from the reaction mixture, by distillation at reduced pressure.

Gas-chromatographic analysis and mass-spectrometric examination showed the remaining 171.3 grams of liquid to contain 80.4% by weight of N-cyclohexyl-γ-cyanobutyraldimine and 15.6% by weight of N-cyclohexylcrotonaldimine. The conversion of the acrylonitrile amounted to 17%. The yield, calculated on the basis of the acrylonitrile consumption, was 91%.

EXAMPLE IV

N-tertiary-butylacetaldimine (1089 grams; 11 moles), acrylonitrile (265 grams; 5 moles), and hydroquinone (1 gram) were introduced into a 3-liter autoclave equipped with a stirrer. The mixture was heated under nitrogen pressure to 80° C. and maintained under a nitrogen pressure of 3 atm. for 2 hours at 80° C., with stirring. Thereafter, the autoclave was connected to distillation equipment and the pressure slowly reduced to that of the atmosphere, after which 86.7 g. of tertiary butylamine was distilled off at a temperature of 60° C. Subsequently, a mixture of 787 g. of non-converted N-tertiary-butylacetaldimine and 233 g. of non-converted acrylonitrile was recovered, at reduced pressure and at a temperature of 60° C. The mixture of acrylonitrile and N-tertiary-butylacetaldimine can be recycled for the preparation of another quantity of the γ-cyanobutyraldimine.

An amount of 238.4 g. of liquid remains behind. Gas-chromatographic analysis and mass-spectrometric examination showed the remaining liquid (238.4 grmas) contained 63% by weight of N-tertiary-butylcrotonaldimine and 37% by weight of N-tertiary-butyl-γ-cyanobutyraldimine. The conversion of the acrylonitrile was 12.1% and the yield, calculated on the acrylonitrile consumption, was 95.6%.

What is claimed is:

1. A process which comprises reacting an acetaldimine having a secondary or tertiary carbon atom of a lower alkyl or cycloalkyl group of from 4 to 7 ring carbon atoms bound to its imine nitrogen atom with acrylonitrile to form the corresponding N-substituted - γ - cyanobutyraldimine, at a temperature of from about 70° C. to 130° C., wherein said reactants are in a molar ratio of at least about 0.8 mole of said acetaldimine per mole of acrylonitrile, and thereafter separating the non-converted acylonitrile and acetaldimine from the reaction mixture containing the desired N-substituted-γ-cyanobutyraldimine product when about 10% to about 50% of the acrylonitrile has been converted.

2. The process according to claim 1 wherein said acetaldimine is selected from the class of N-cyclohexylacetaldimine and N-tertiary-butylacetaldimine.

3. The process according to claim 1 wherein the reaction is conducted at a temperature of from about 80° C. to 120° C.

4. The process according to claim 1 wherein said ratio of acetaldimine to acrylonitrile is greater than about 1.5:1.

5. The process according to claim 1 wherein from about 10% to 35% of said acrylonitrile has been converted.

6. The process according to claim 1 wherein said reaction is conducted in a non-aqueous solvent.

7. The process according to claim 6 wherein said solvent is selected from the class of benzene, toluene, dimethylsulphoxide or benzonitrile.

8. The process according to claim 1 wherein said reaction mixture is substantially water-free.

References Cited

UNITED STATES PATENTS

| | | | |
|---|---|---|---|
| 2,394,530 | 2/1946 | Bruson et al. | 260—465.5 X |
| 2,768,962 | 10/1956 | Krimm | 260—465.5 X |
| 3,048,615 | 8/1962 | Fields | 260—465.5 X |

JOSEPH P. BRUST, Primary Examiner

U.S. Cl. X.R.

260—465.1, 465.5 R